(12) United States Patent
Mccorriston

(10) Patent No.: US 12,525,913 B1
(45) Date of Patent: Jan. 13, 2026

(54) SYSTEM FOR MOUNTING SOLAR PANELS ON SHIPPING CONTAINERS

(71) Applicant: Safe Box Steel Structures Inc., Saskatoon (CA)

(72) Inventor: Channing Mccorriston, Saskatoon (CA)

(73) Assignee: Safe Box Steel Structures Inc., Saskatoon (CA)

( * ) Notice: Subject to any disclaimer, the term of this patent is extended or adjusted under 35 U.S.C. 154(b) by 0 days.

(21) Appl. No.: 18/815,196

(22) Filed: Aug. 26, 2024

(51) Int. Cl.
  *H02S 20/30* (2014.01)
  *B65D 88/12* (2006.01)
  *B65D 90/00* (2006.01)

(52) U.S. Cl.
  CPC ............ *H02S 20/30* (2014.12); *B65D 88/121* (2013.01); *B65D 90/00* (2013.01)

(58) Field of Classification Search
  CPC .............................. H02S 20/30; B65D 88/121
  USPC ........................................................ 248/122.1
  See application file for complete search history.

(56) References Cited

U.S. PATENT DOCUMENTS

| | | | | |
|---|---|---|---|---|
| 5,228,924 A * | 7/1993 | Barker | ................... | H02S 20/30 136/246 |
| 8,413,391 B2 * | 4/2013 | Seery | ....................... | F24S 25/12 52/173.3 |
| 9,057,546 B2 * | 6/2015 | Sade | ...................... | F24S 30/428 |
| 9,612,039 B2 * | 4/2017 | Meppelink | ............ | F24S 30/455 |
| 10,727,778 B2 * | 7/2020 | Carrington | .............. | H02S 10/40 |
| 11,108,354 B2 * | 8/2021 | Carrington | .............. | H02S 30/20 |
| 11,444,568 B2 * | 9/2022 | Carrington | .............. | H02S 20/30 |
| 11,923,801 B2 * | 3/2024 | Prentice | ................... | H02S 10/40 |
| 11,949,365 B2 * | 4/2024 | Materna | ................... | H02S 20/30 |
| 12,381,510 B2 * | 8/2025 | Roux Hameed | ........ | H02S 30/20 |
| 12,431,836 B1 * | 9/2025 | Li | ........................... | H02S 20/30 |
| 12,431,837 B1 * | 9/2025 | Hong | ...................... | H02S 20/30 |

\* cited by examiner

*Primary Examiner* — Todd M Epps
(74) *Attorney, Agent, or Firm* — Spencer Fane, LLP

(57) ABSTRACT

A system for mounting a solar panel on a shipping container. The system has a fixed strut secured to the shipping container, a first pivot adjacent a first end of the fixed strut, the first pivot pivotably retaining a first end of a first movable strut member for pivotable movement of the first movable strut member relative to the fixed strut, a second movable strut member, a first end of the second movable strut member pivotably connected to a second end of the first movable strut member by a second pivot, and a third pivot retaining a second end of the second movable strut member, the third pivot movable along the fixed strut. The first movable strut member directly or indirectly supports the solar panel, such that pivoting of the first movable strut member changes an angle of the solar panel relative to the shipping container; as the third pivot member is moved toward the first end of the fixed strut, the second pivot member is moved away from the fixed strut and the angle of the solar panel increases, and as the third pivot member is moved toward the second end of the fixed strut the second pivot member is drawn toward the fixed strut and the angle of the solar panel decreases.

18 Claims, 20 Drawing Sheets

SYSTEM FOR MOUNTING SOLAR PANELS ON SHIPPING CONTAINERS

TECHNICAL FIELD OF THE INVENTION

The present invention pertains generally to the field of solar panel mounting systems and, more particularly, to a modular systems for installing solar panels on the sidewalls and/or roofs of shipping containers.

BACKGROUND OF THE INVENTION

The increasing use of shipping containers as modular structures for various purposes, such as mobile offices, temporary housing, and portable storage, has highlighted the need for efficient and adaptable renewable energy solutions for such modular structures. Solar panels provide a sustainable and cost-effective energy source, but the unique structural characteristics of shipping containers present specific challenges for solar panel installation. These challenges include the need for robust mounting systems that can accommodate the corrugated surfaces and limited roof space of shipping containers, as well as the ability to withstand environmental factors such as wind and rain.

Traditionally, mounting solar panels on shipping containers required custom fabrication and installation processes, which could be time-consuming, labor-intensive, and costly.

The need for specialized tools and expertise often limited the feasibility of solar panel installations in remote or under-resourced locations. Furthermore, the transportation and handling of large mounting systems could pose logistical challenges, particularly for projects requiring swift deployment and flexibility.

SUMMARY OF THE INVENTION

The present invention relates to a mounting system for the installation of solar panels on the sidewalls and/or roof of shipping containers. Systems according to the present invention may be installed on either side of the sidewalls, providing flexibility in application. The system includes brackets, strut-trolleys, and associated hardware components, which can enable the use of strut channels, slotted extrusions such as T-slotted extrusions, or any other suitable track-like structure, as the primary structural elements.

A feature in some modular embodiments of the present invention is the ability to install the mounting system incrementally, allowing users to add more mounting components for additional solar panels as needed without affecting previously installed components. This modular approach accommodates phased project implementations and budgetary constraints. Systems according to the present invention may include components such as strut hinges, offset strut hinges, strut sliders, fixed hinges, panel mounts, and strut-trolleys, which are configured to work with strut channels, slotted extrusions, or any other suitable track-like structure, allowing users to tailor the system to their specific container configurations and solar panel sizes.

Systems according to the present invention may be adapted to different container configurations and solar panel sizes. Additionally, exemplary systems may allow for adjustable slopes for the installed solar panels, ranging for example from flat (0 degrees) to inclined (80 degrees), accommodating optimal solar exposure and maximizing energy efficiency. The ability to adjust angles enhances the efficiency of energy capture by aligning the panels with the sun's trajectory, maximizing power generation throughout the day.

Systems according to the present invention may include the installation of up to ten solar panels on a standard 20-foot shipping container, with the potential to scale up to twenty panels for a 40-foot shipping container. This scalability may help ensure that the system can meet the energy demands of diverse applications, from small-scale personal projects to larger commercial installations. The simplicity and efficiency of the exemplary systems described herein represent a significant innovation in the field of solar energy systems for shipping containers. By reducing the complexity and cost associated with traditional mounting solutions, the invention may make renewable energy more accessible and practical for a wide range of users.

Exemplary embodiments allow for flexible positioning of the solar panels, with a wide range of installation angles from 0 degrees to 80 degrees relative to the roof or sidewall, as described and illustrated herein. This flexibility in slope adjustment enables optimal positioning of the solar panels for maximum solar exposure, regardless of the container's orientation or geographic location. The strut slider, integrated with the roof pivot, enhances this flexibility. The strut slider connects to the strut trolley or rigid fastener (allowing vertical movement or rigid fastening) and securely fastens to the struts mounted on the roof. This configuration acts as the prismatic joint of a 180-degree slider-crank mechanism, optimizing energy capture by aligning the panels with the sun's trajectory.

Systems according to the present invention may be configured to accommodate a wide range of solar panel sizes, such as for example from 0.5 m×1 m to 1.2 m×2.5 m. This flexibility helps ensure that users can select panels based on availability, cost, and performance preferences. The versatile mounting system secures solar panels in conjunction with low-profile strut channels, tracks, or other similar suitable components, which support the panels. The panel mounts may be connected by fasteners with height adjustments to accommodate the thickness of various solar panels.

The components, such as the strut hinge, offset strut hinge, strut slider, fixed hinge, panel mount, strut-trolleys, and brackets, are preferably made from durable materials that help ensure long-lasting structural integrity. The use of strut channels as the main structural element provides robust support for the solar panels, capable of withstanding harsh environmental conditions, including wind, rain, and temperature fluctuations.

According to a first broad aspect of the present invention there is a provided a system for mounting a solar panel on an exterior surface of a shipping container, the system comprising:

at least one fixed strut positionable along the exterior surface of the shipping container, the at least one fixed strut comprising opposed first and second ends, a first pivot member adjacent the first end of the at least one fixed strut, the first pivot member for pivotably retaining a first end of a first movable strut member for pivotable movement of the first movable strut member relative to the at least one fixed strut;

a second movable strut member, a first end of the second movable strut member pivotably connected to a second end of the first movable strut member by a second pivot member; and a third pivot member configured to pivotably retain a second end of the second movable strut member, the third pivot member movable along the at least one fixed strut;

the first movable strut member configured to support the solar panel, such that pivoting of the first movable strut member changes an angle of the solar panel relative to the exterior surface of the shipping container;

such that as the third pivot member is moved toward the first end of the at least one fixed strut, the second pivot member is moved away from the at least one fixed strut and the angle of the solar panel relative to the exterior surface of the shipping container thereby increases; and such that as the third pivot member is moved toward the second end of the at least one fixed strut, the second pivot member is drawn toward the at least one fixed strut and the angle of the solar panel relative to the exterior surface of the shipping container thereby decreases.

Some exemplary embodiments of the first broad aspect further comprise first and second brackets configured to be secured in spaced-apart arrangement on the exterior surface of the shipping container, the first and second brackets configured to retain the at least one fixed strut therebetween along the exterior surface of the shipping container, the first bracket comprising the first pivot member.

In some exemplary embodiments the at least one fixed strut comprises two fixed struts in side-by-side arrangement to support sides of the solar panel.

The first movable strut member preferably comprises a support member thereon, the support member sized and configured to support the solar panel. In some such cases, the support member comprises at least two parallel struts parallel to the at least one fixed strut, and at least two cross members perpendicular to the at least two parallel struts, the at least two cross members configured to receive and retain the solar panel. In some exemplary embodiments the support member comprises a handle distal from the first pivot member for use in pivoting the solar panel.

In some exemplary embodiments comprising the first and second brackets, the first and second brackets are secured to hollow structural members at opposed edges of the shipping container, such that securing means pass into the hollow structural members without compromising an interior space of the shipping container.

The angle of the solar panel relative to the exterior surface of the shipping container may be selectable between 0 degrees and 80 degrees.

In some exemplary embodiments the at least one fixed strut comprises an outwardly-facing channel, the third pivot member comprising a strut trolley movable within the channel, the strut trolley supporting a hinge member configured to hingedly connect with the second end of the second movable strut member. In some such cases, the third pivot member further comprises a strut slider connected to the strut trolley and configured for movement along the channel, the strut slider comprising a pin for selectively locking the third pivot member at any of a plurality of selectable positions along the at least one fixed strut to thereby immobilize the solar panel at a given angle relative to the exterior surface of the shipping container.

In some exemplary embodiments in which the at least one fixed strut comprises an outwardly-facing channel, the first and second movable strut members may be configured for at least partial nesting within the channel when the third pivot member is moved toward the second end of the at least one fixed strut.

The exterior surface may be either a roof or a sidewall of the shipping container. In some exemplary embodiments the exterior surface is both a roof and a sidewall of the shipping container, wherein the system comprises at least one fixed roof strut positionable along the roof of the shipping container and at least one fixed sidewall strut positionable along the sidewall of the shipping container.

According to a second broad aspect of the present invention there is provided a shipping container-mounted solar panel arrangement comprising:

a shipping container comprising an exterior surface;

at least one fixed strut secured along the exterior surface of the shipping container, the at least one fixed strut comprising opposed first and second ends;

a first pivot member adjacent the first end of the at least one fixed strut, the first pivot member pivotably retaining a first end of a first movable strut member for pivotable movement of the first movable strut member relative to the at least one fixed strut;

a second movable strut member, a first end of the second movable strut member pivotably connected to a second end of the first movable strut member by a second pivot member; and a third pivot member pivotably retaining a second end of the second movable strut member, the third pivot member movable along the at least one fixed strut;

the first movable strut member supporting the solar panel, such that pivoting of the first movable strut member changes an angle of the solar panel relative to the exterior surface of the shipping container;

such that as the third pivot member is moved toward the first end of the at least one fixed strut, the second pivot member is moved away from the at least one fixed strut and the angle of the solar panel relative to the exterior surface of the shipping container thereby increases; and such that as the third pivot member is moved toward the second end of the at least one fixed strut, the second pivot member is drawn toward the at least one fixed strut and the angle of the solar panel relative to the exterior surface of the shipping container thereby decreases.

Some exemplary embodiments of the second broad aspect comprise first and second brackets in spaced-apart arrangement on the exterior surface of the shipping container, the first and second brackets retaining the at least one fixed strut therebetween along the exterior surface of the shipping container, the first bracket comprising the first pivot member.

The at least one fixed strut may comprise two fixed struts in side-by-side arrangement to support sides of the solar panel.

The exterior surface may be either a roof or a sidewall of the shipping container. In some exemplary embodiments the exterior surface is both a roof and a sidewall of the shipping container, wherein the arrangement comprises at least one fixed roof strut secured along the roof of the shipping container and at least one fixed sidewall strut secured along the sidewall of the shipping container.

The present invention presents a highly flexible, cost-effective, and user-friendly solution for mounting solar panels on shipping containers. Its modular design, adjustable installation angles, and compatibility with a wide range of solar panel sizes make it a valuable innovation for promoting the use of renewable energy in various applications. By addressing the challenges of installation, cost, and scalability, this modular mounting system facilitates the integration of solar power into existing infrastructure, contributing to a sustainable and energy-efficient future.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Figure 1A:
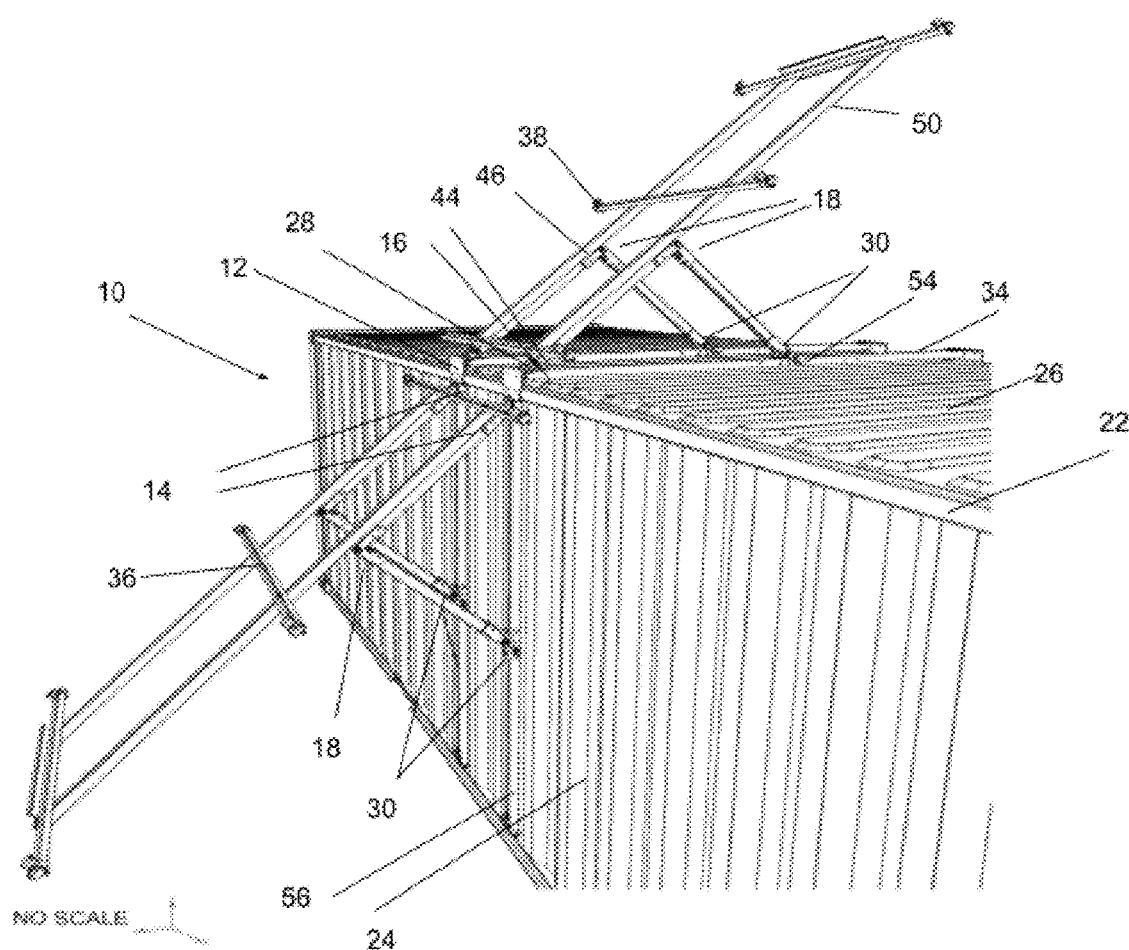
FIG. 1A illustrates a perspective view of an exemplary modular mounting system with strut members, after installation on a shipping container.

Exemplary embodiments will now be described with reference to the accompanying drawings.

DETAILED DESCRIPTION OF EXEMPLARY EMBODIMENTS

Throughout this description, specific details are provided to enhance the understanding of those skilled in the art. However, commonly known elements may not be described in detail to avoid unnecessarily complicating the disclosure. The examples of the invention described are not meant to be exhaustive or to limit the invention to the specific forms presented. Therefore, the description and drawings should be viewed as illustrative rather than restrictive. The detailed description refers to the accompanying drawings, where the same reference numbers in different drawings may indicate identical or similar elements.

The present invention relates to a mounting system for the installation of solar panels on the sidewall and/or roof of a shipping container. The system comprises brackets, strut-trolleys, and hardware that employs strut channels as the primary structural component. This modular system provides a flexible and scalable solution for mounting solar panels on shipping containers, accommodating various panel sizes and configurations.

FIG. 1 provides a perspective view of the individual modular mounting kit 10 on the shipping container, illustrating the assembled components, including roof brackets 12 and sidewall brackets 14, strut hinge 44, offset strut hinge 46, strut slider 54, fixed hinge 28, and panel mounts 38. This view depicts the strut channel positions for the placement of solar panels on the roof 26 and sidewall 24 of the shipping container, the fixed pivot 16 at one end of the sidewall strut 56 or roof strut 34, the moving pivot 18 in the middle of the sidewall strut 56 or roof strut 34, and the moving pivot 30 at the other end of the sidewall strut 56 or roof strut 34.

This exemplary embodiment includes roof brackets 12 and sidewall brackets 14 attached to the top hollow structural member 22 of the container, facilitating the installation of strut channels and solar panels without affecting the container envelope. The roof brackets 12 provide rigid support to the roof struts 34, hold a fixed hinge 28 on top, and form a fixed pivot 16. Similarly, the sidewall brackets 14 provide rigid support to the sidewall strut 56, hold a fixed hinge on top, and form a fixed pivot. These fixed hinges serve as hinge connection points at the fixed pivot 16, holding the low-profile struts 36 longitudinally and long struts 50 laterally to secure the solar panels on the sidewalls 24 and roof 26.

Additionally, the exemplary system includes strut-trolleys 32 at the moving pivot 30 at the end of the roof strut 34 or sidewall strut 56, and the necessary hardware, such as bolts, nuts, washers, and/or other fasteners, all preferably made from stainless steel or other corrosion-resistant materials. This view demonstrates how the fixed pivot 16 and moving pivots 18 and 30 interact with the strut channels. The strut channels are measured and cut to the desired lengths based on the dimensions of the shipping container and the number of solar panels.

Figure 1B:
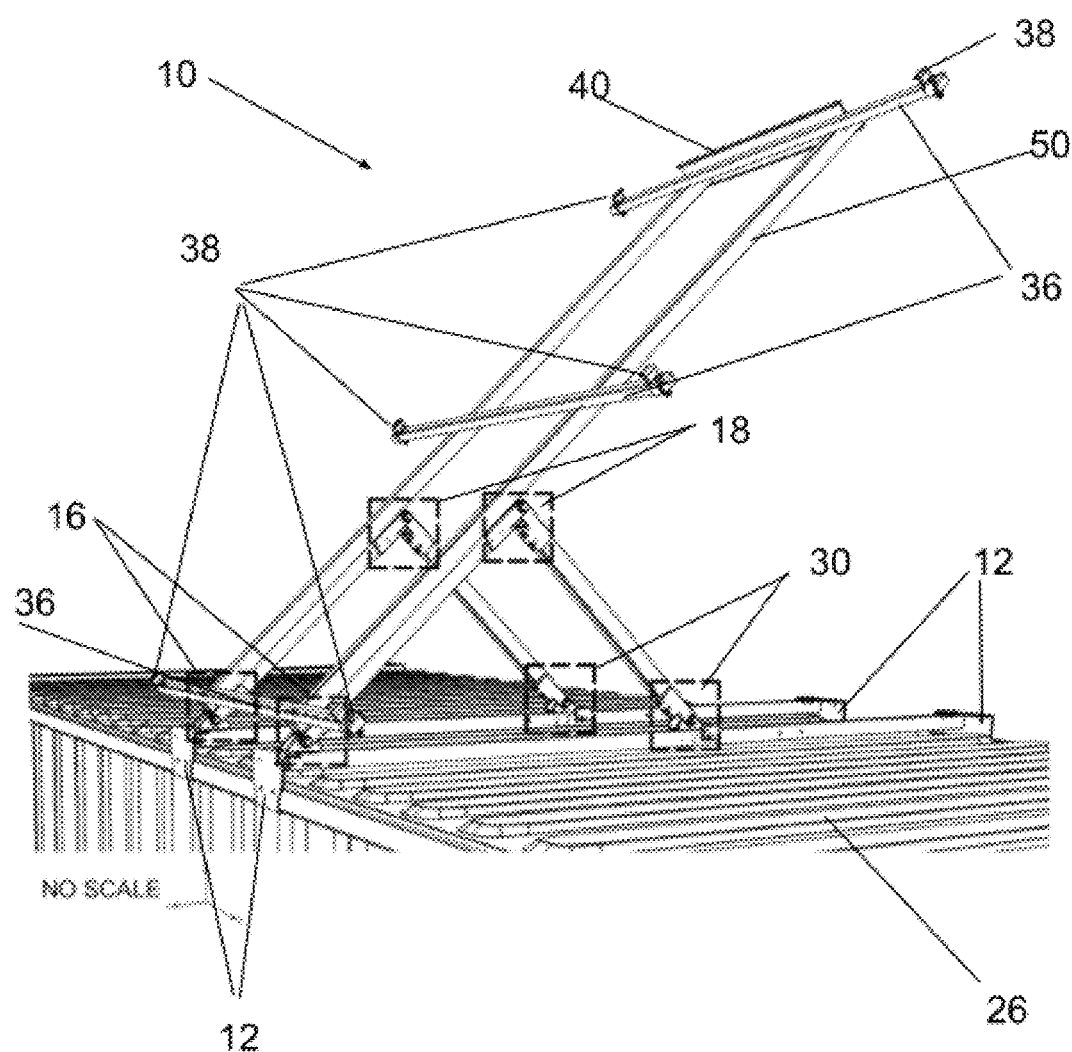
FIG. 1B provides an enlarged perspective view of the embodiment of FIG. 1A after installation on the roof with marked pivot points.

FIG. 1B provides a perspective view of the exemplary system installed on the roof 26 of the shipping container. This figure highlights the fixed pivot point 16, moving pivot 18 and moving pivot 30. The low-profile struts 36 and long struts 50 provide support for mounting the solar panels. The solar panels are secured onto the low-profile struts 36 by panel mounts 38. Additionally, a handle 40 is included to facilitate the lifting of the solar panel.

Figure 1C:
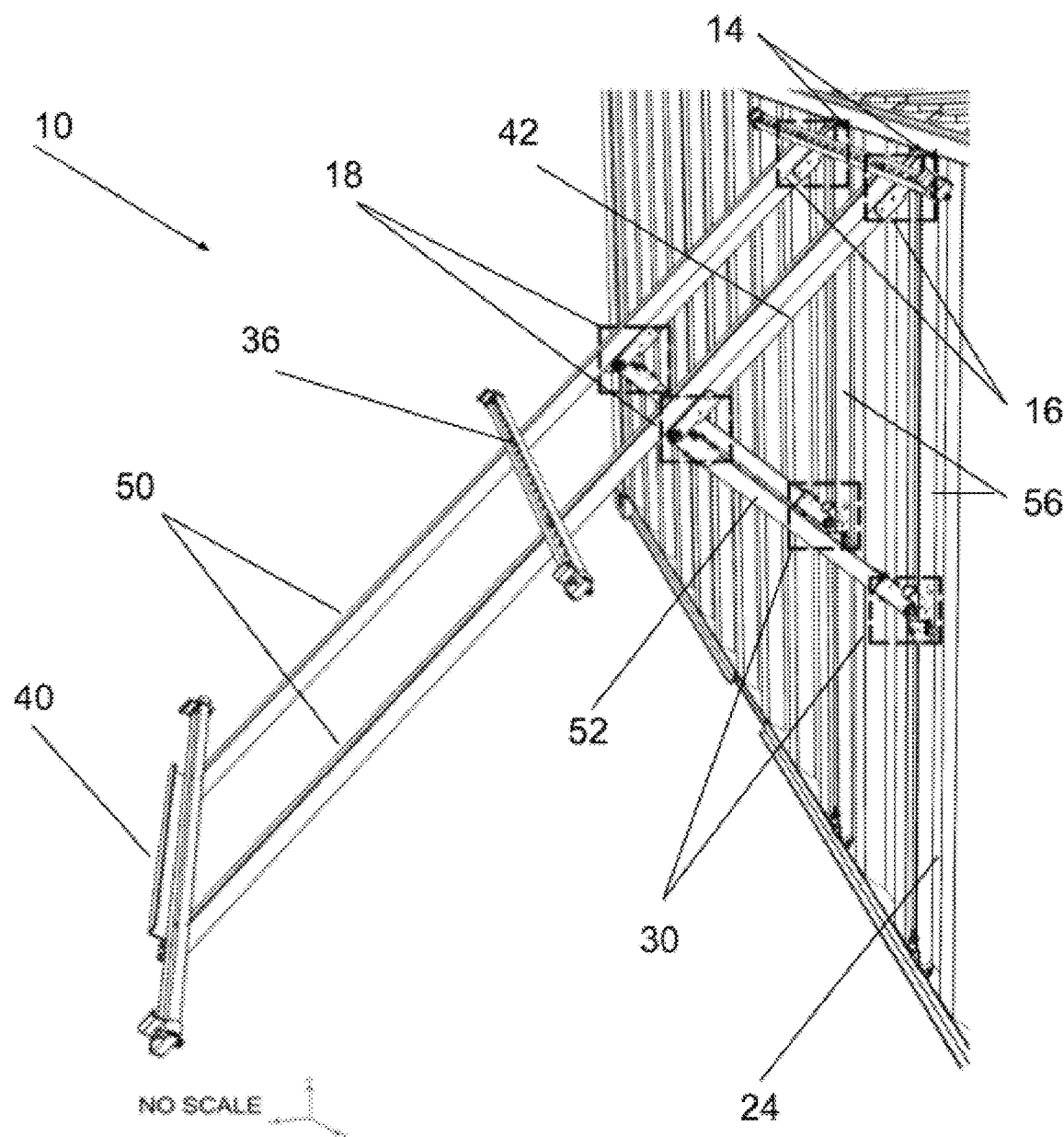
FIG. 1C provides an enlarged perspective view of the embodiment of FIG. 1A after installation on the sidewall with marked pivot points.
Figure 1D:
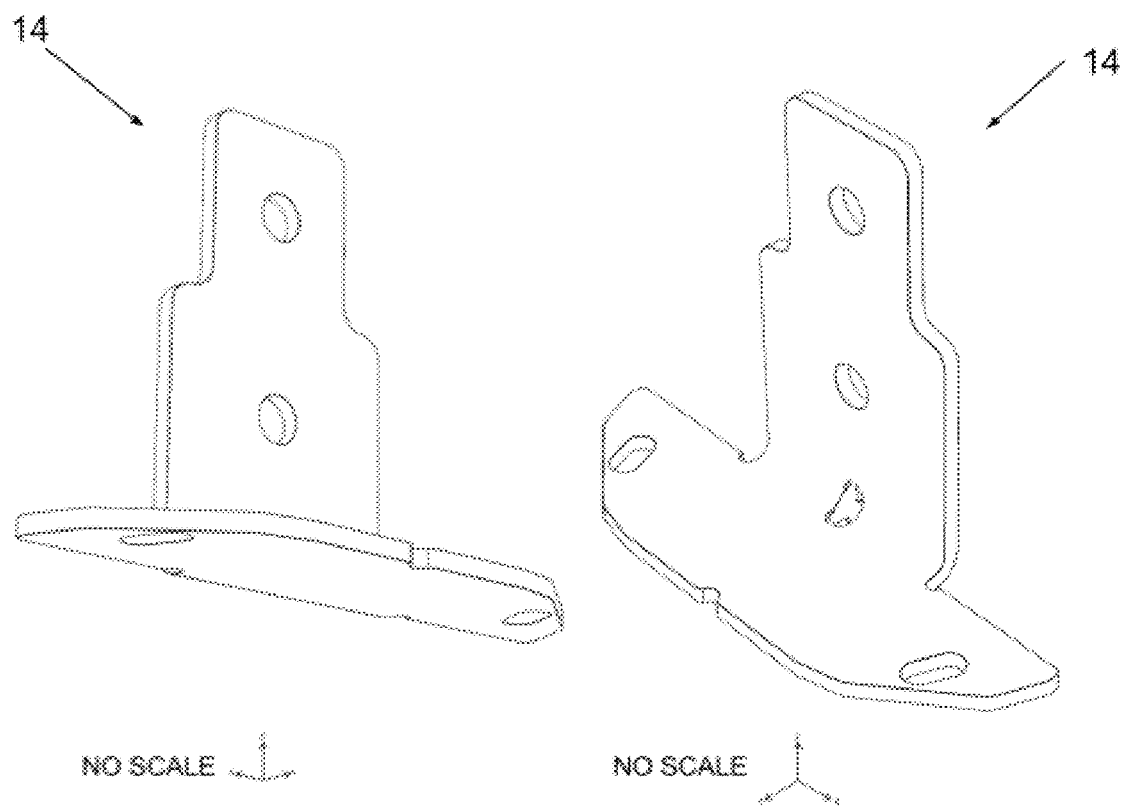
FIG. 1D is a perspective view of an exemplary sidewall bracket of a modular mounting system.

FIG. 1C and FIG. 1D illustrates the perspective view of the exemplary system installed on the sidewall 24 and perspective view of the sidewall bracket 14. The exemplary system is attached to the sidewall brackets 14 and supported by strut members. Similar to the roof portion, the sidewall 24 system consists of fixed pivot point 16, moving pivot 18 and moving pivot 30, which facilitates the movement of the mounting struts.

Figure 2A:
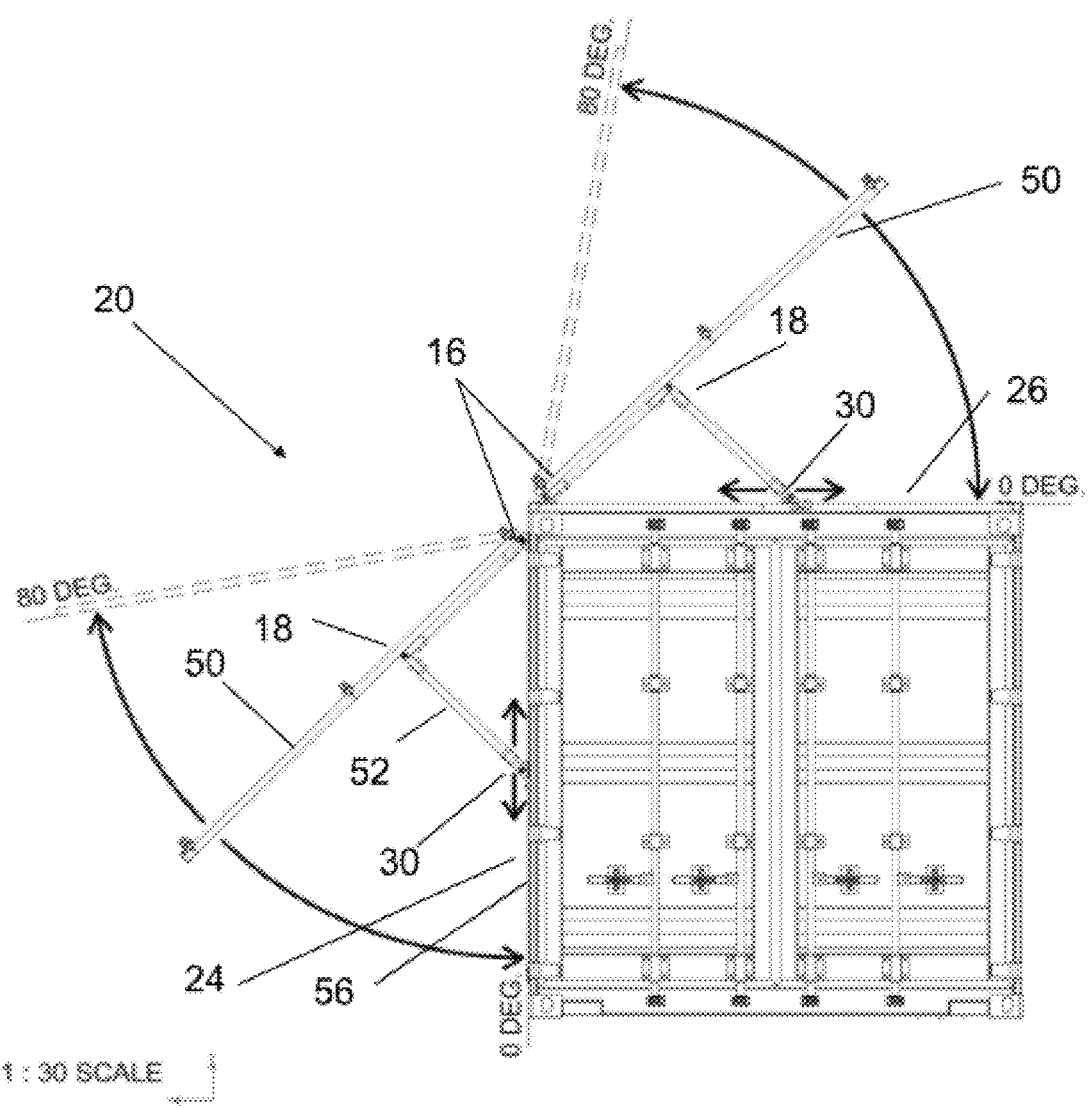
FIG. 2A is a front elevation view of the embodiment of FIG. 1A, depicting the angle configuration and the variation in slope of the solar panel supports.
Figure 2B:
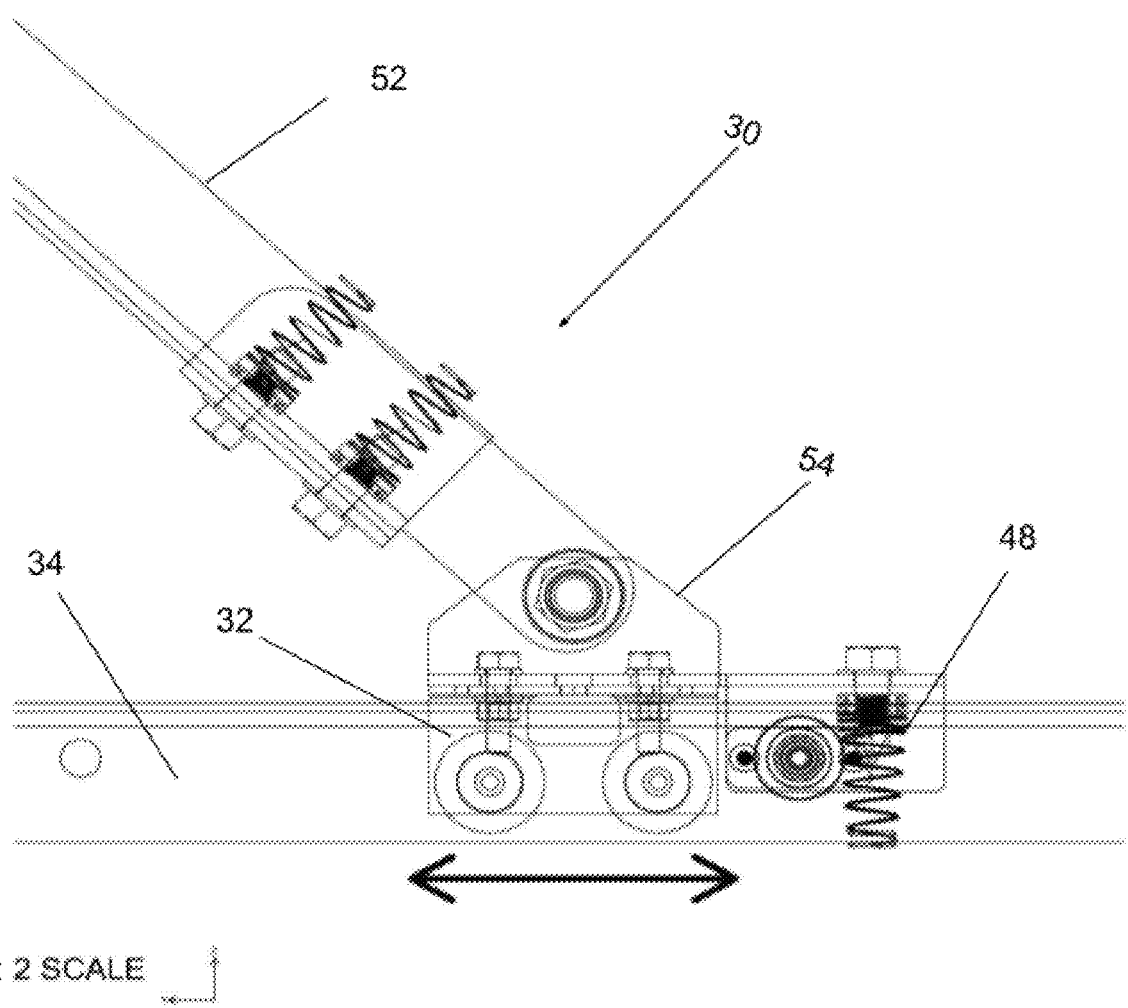
FIG. 2B is a detailed sectional view of an exemplary strut-trolley mechanism for a modular mounting system.

FIG. 2A and FIG. 2B together illustrate the front elevation view and a detailed view of the strut-trolley mechanism 32 at the moving pivot 30, which is for adjusting the angle of the exemplary system on the roof 26 and/or sidewall 24 of a shipping container. The system is configured to transition from a flat position, parallel to the roof or sidewall (zero degrees), to an inclined position of up to 80 degrees towards the fixed pivot 16, as shown in FIG. 2A.

As the mounting kit is elevated or lowered by the handle 40 in FIG. 1, the strut-trolley mechanism 32, incorporated at the moving pivot 30 as best seen in FIG. 2B, facilitates the controlled movement of the strut slider 54 along the roof strut 34 or sidewall strut 56. This movement adjusts the angle of the solar panels, with the strut-trolley 32 moving towards the fixed pivot 16 to increase the angle is increased, and away from the fixed pivot 16 to decrease the angle.

The interaction between the moving pivot 30, fixed pivot 16, and moving pivot 18 provides secondary support to the mounting struts 50, allowing for a wide range of tilt angles to accommodate different installation requirements on both the sidewall 24 and roof 26. Once the desired angle is achieved, the panels can be securely locked in position using a spring-loaded pin 48, shown in FIG. 2B. This mechanism allows for adjustment and fine-tuning of the solar panels' position and angle. Additionally, when the solar panels are placed in a flat position, they are securely positioned, facilitating transportation or relocation.

Figure 3:
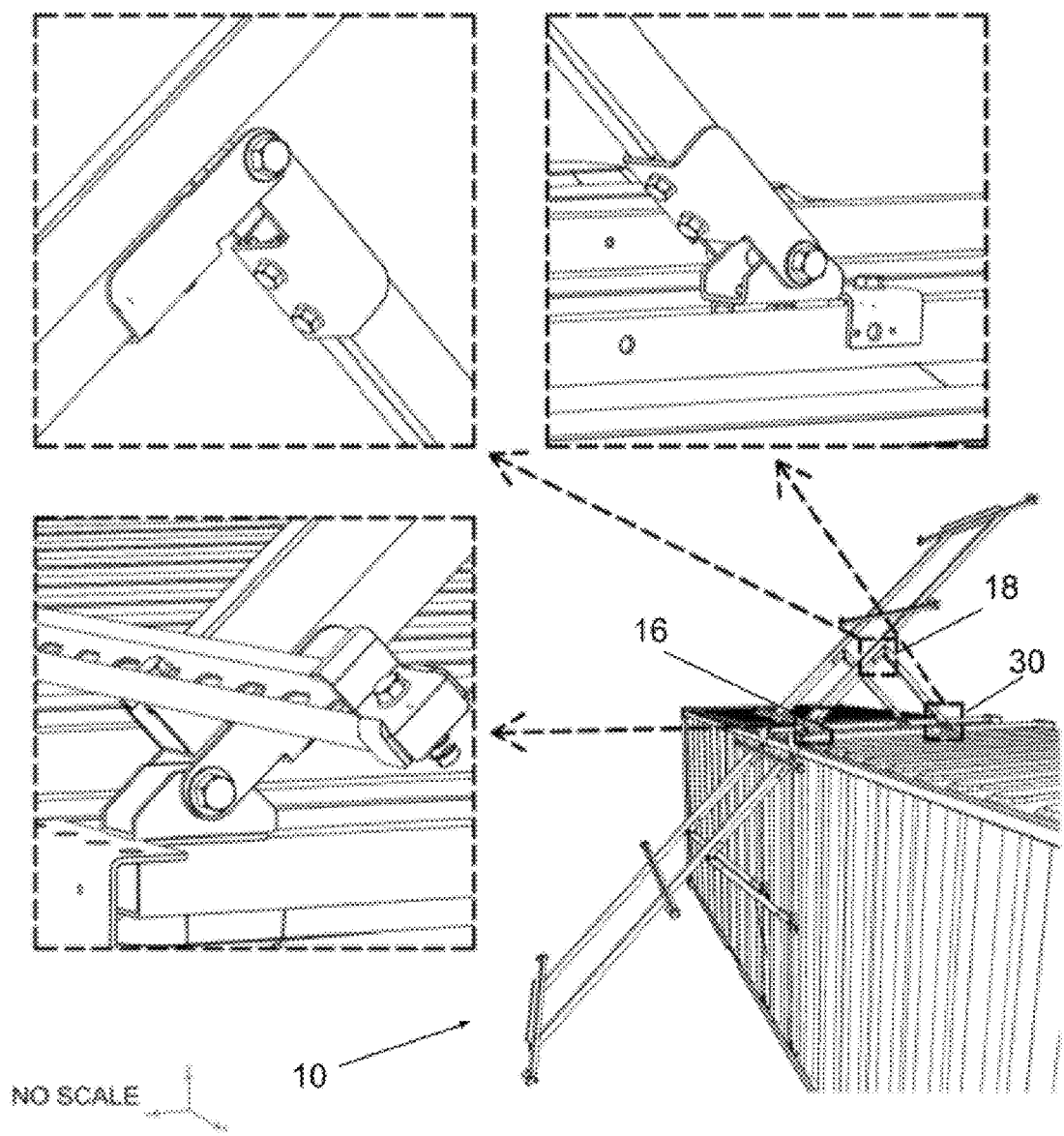
FIG. 3 illustrates enlarged perspective views of the pivot points of an exemplary modular mounting system.

FIG. 3 is a perspective view illustrating the lifted position of a single solar panel mounting system and detailed views of the pivot points. This includes the fixed pivot 16 on each roof strut and sidewall, moving pivot in the middle 18 and moving pivot 30 at the end.

Figure 4A:
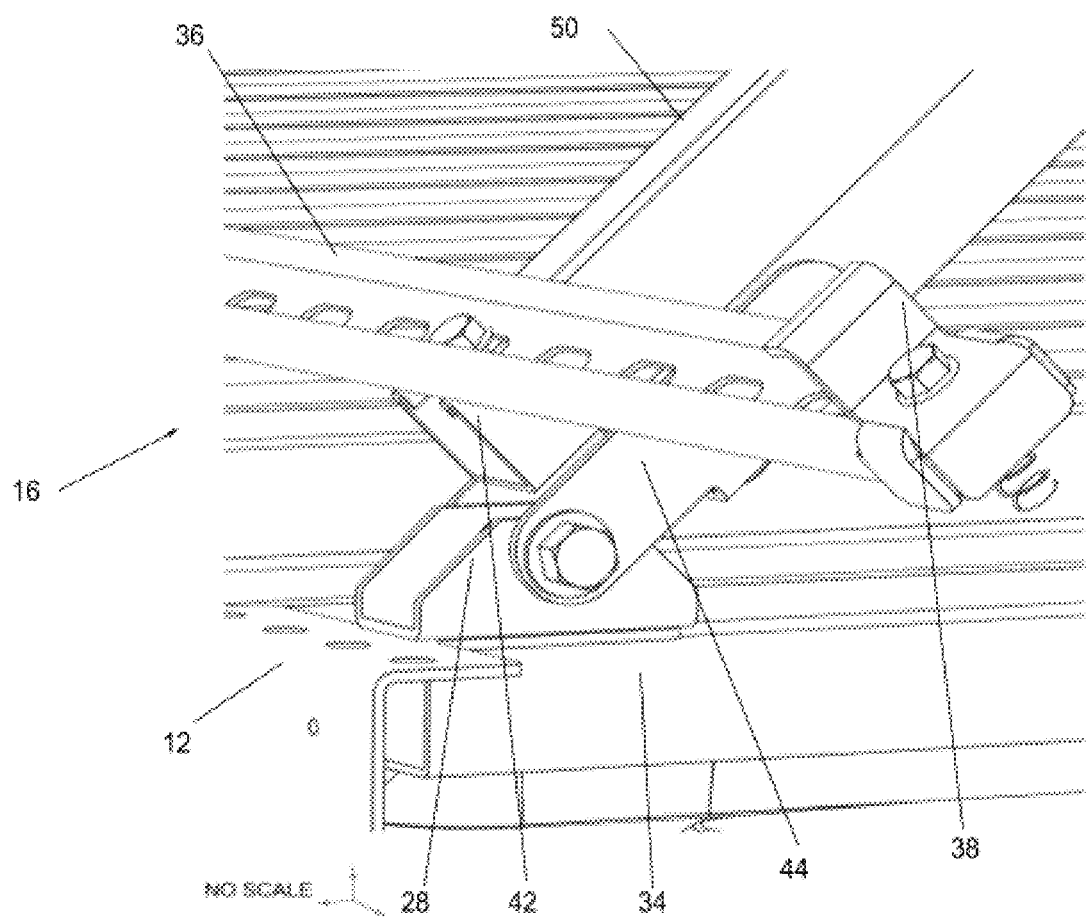
FIG. 4A is an enlarged perspective view of a fixed pivot of an exemplary modular mounting system.

FIG. 4A provides an enlarged perspective view of the fixed pivot 16, including the fixed hinge 28, strut hinge 44, and associated hardware. This fixed hinge 28 is attached to the wall or roof struts 34 and acts as the fixed point of a 180-degree slider-crank linkage. The fixed hinge 28 and strut hinge 44 are preferably fabricated from high-strength steel, aluminum or other suitable material, chosen for their durability and resistance to corrosion. The exemplary embodiment includes pre-drilled holes for easy alignment and secure fastening to the strut channels and the shipping container. These hinges serve as the primary mounting points to the struts.

Figure 4B:
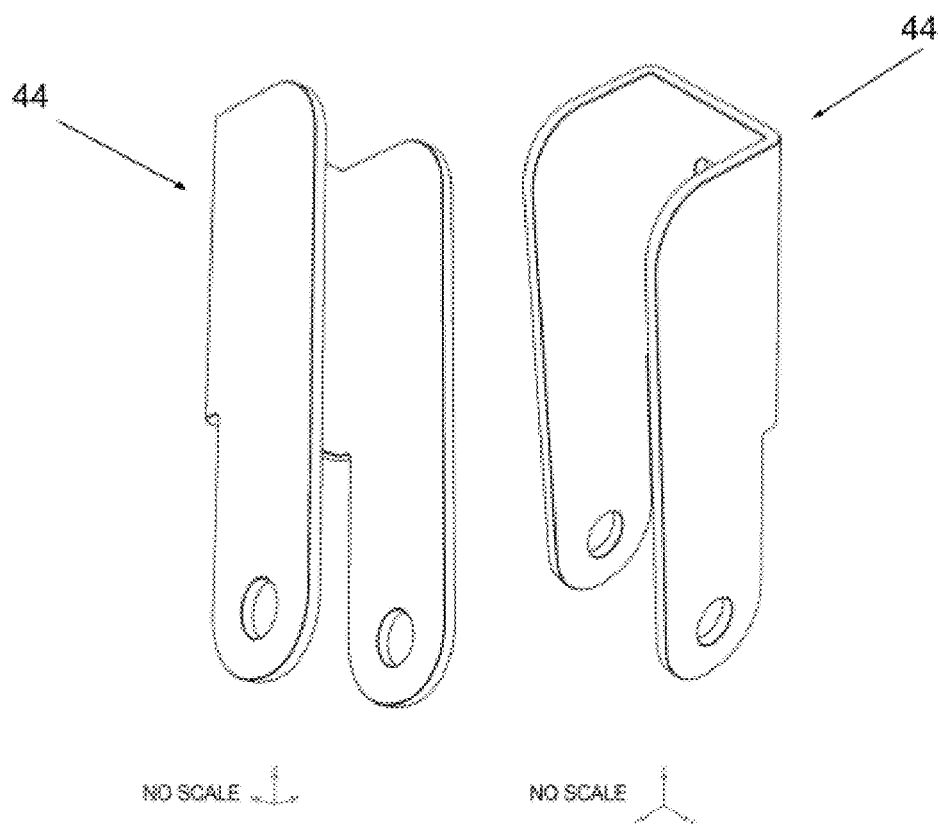
FIG. 4B is a perspective view of an exemplary strut hinge of a modular mounting system.

FIG. 4B provides a detailed perspective view of the strut hinge 44. This component connects the strut 42 to the fixed hinge 28 and supports the long strut 50, allowing for adjustable angles.

Figure 4C:
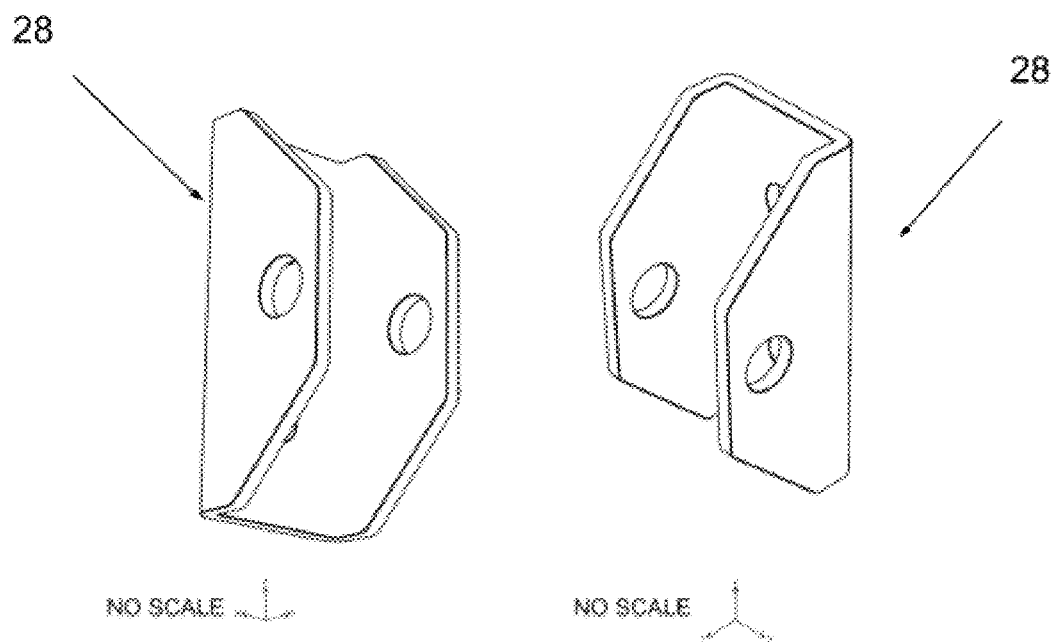
FIG. 4C is a perspective view of an exemplary fixed hinge of a modular mounting system.

FIG. 4C provides a detailed perspective view of the fixed hinge 28, which is mounted on the roof strut 34 in FIG. 4A, providing a secure and non-adjustable connection point between the roof strut 34 and the strut hinge 44.

Figure 4D:
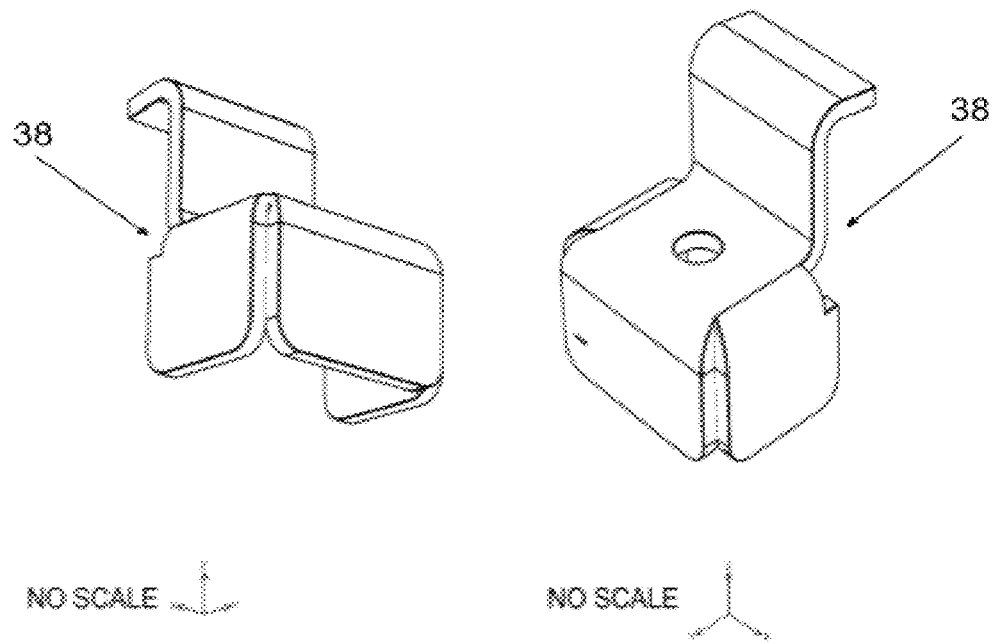
FIG. 4D is a perspective view of an exemplary panel mount of a modular mounting system.

FIG. 4D provides a detailed perspective view of the panel mount 38, which secures the solar panels to the low-profile struts 36. These mounts 38 are fastened to the low-profile struts 36 using bolts, creating a stable and secure platform for the solar panels. The design of the panel mounts 38 accommodates various solar panel sizes, ranging from 0.5 m×1 m to 1.2 m×2.5 m, ensuring adaptability to different project requirements and available panel options.

Figure 4E:
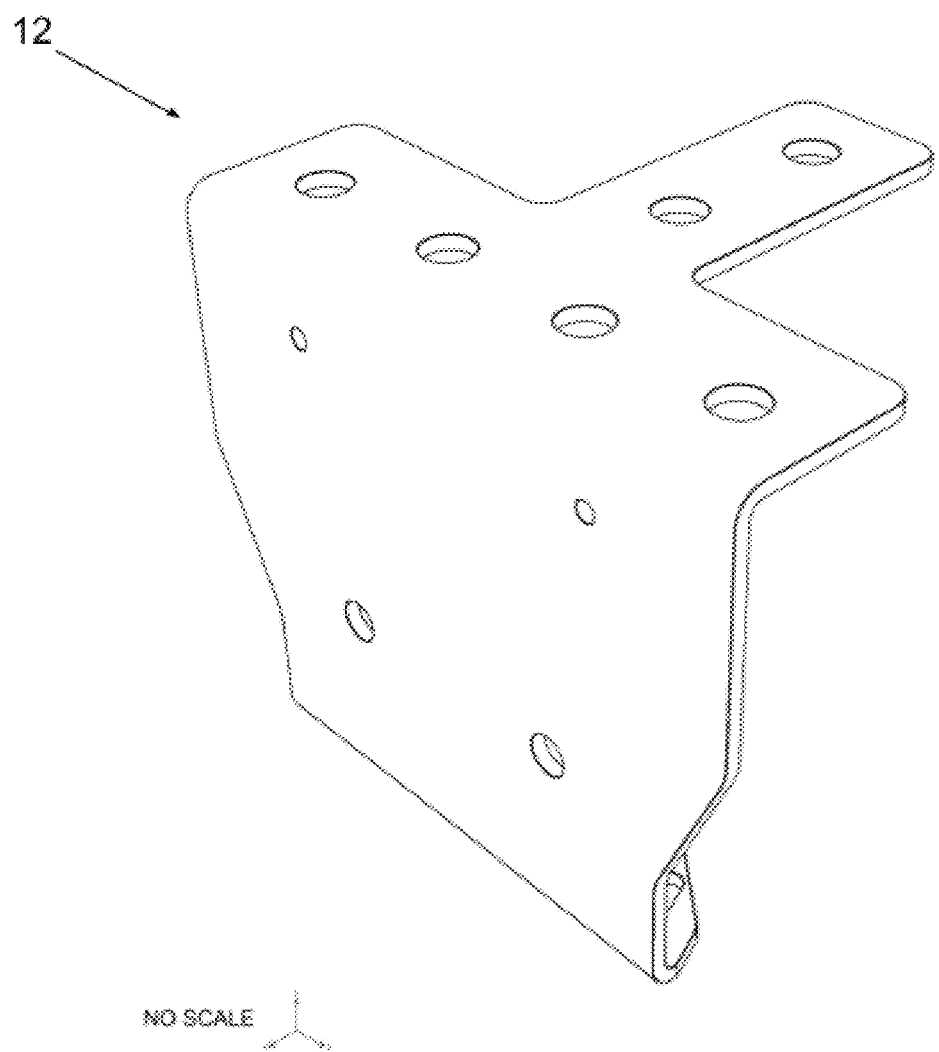
FIG. 4E is a perspective view of an exemplary roof bracket of a modular mounting system.

FIG. 4E provides a detailed perspective view of the roof bracket 12, which is installed on the roof top hollow structural member 22. Each roof strut 34 is supported with roof brackets 12 to provide rigid support to the mounting system.

Figure 5A:
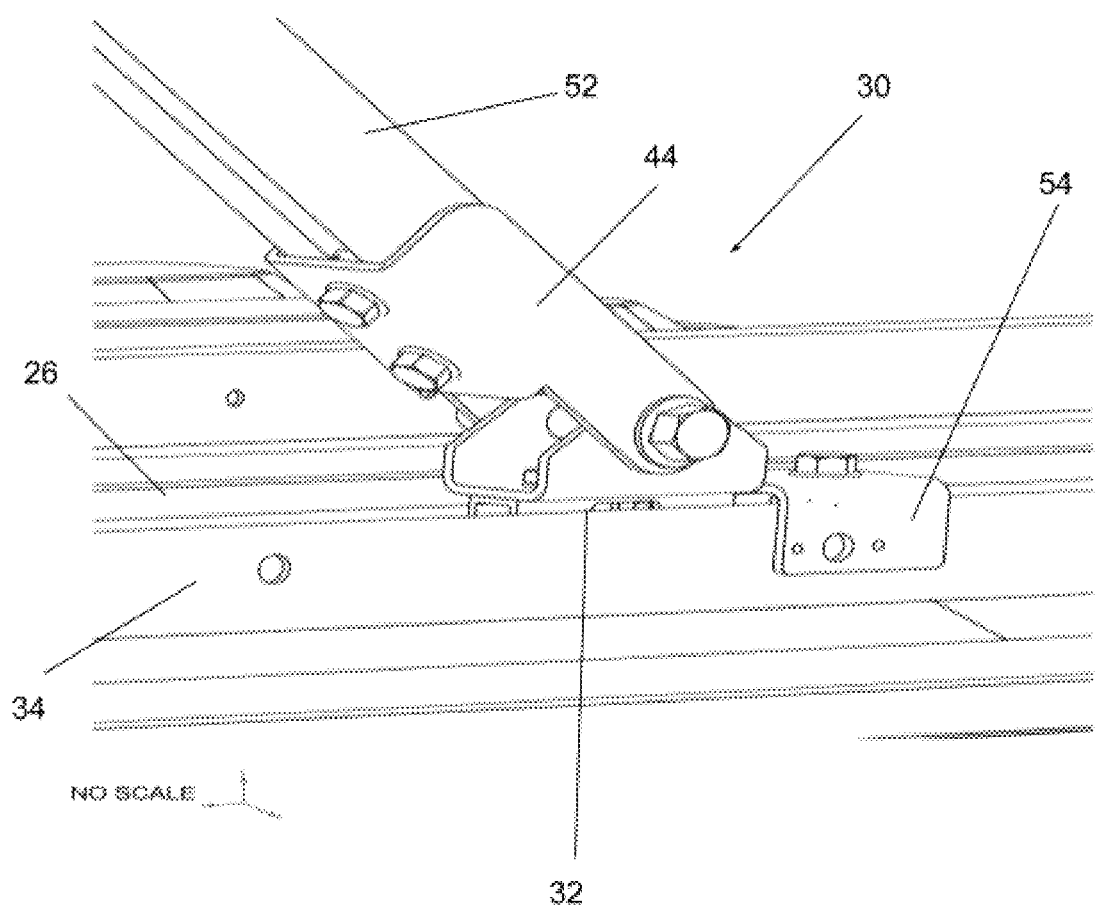
FIG. 5A is an enlarged perspective view of a moving pivot of an exemplary modular mounting system.

FIG. 5A provides an enlarged detailed perspective view of a moving pivot 30, which incorporates the spring-loaded pin 48 shown in FIG. 2B, fixed hinge 44, strut slider 54, strut-trolley 32, and associated hardware. The strut-trolleys 32 slide within the strut channels 34, allowing for adjustable positioning of the solar panels.

Figure 5B:
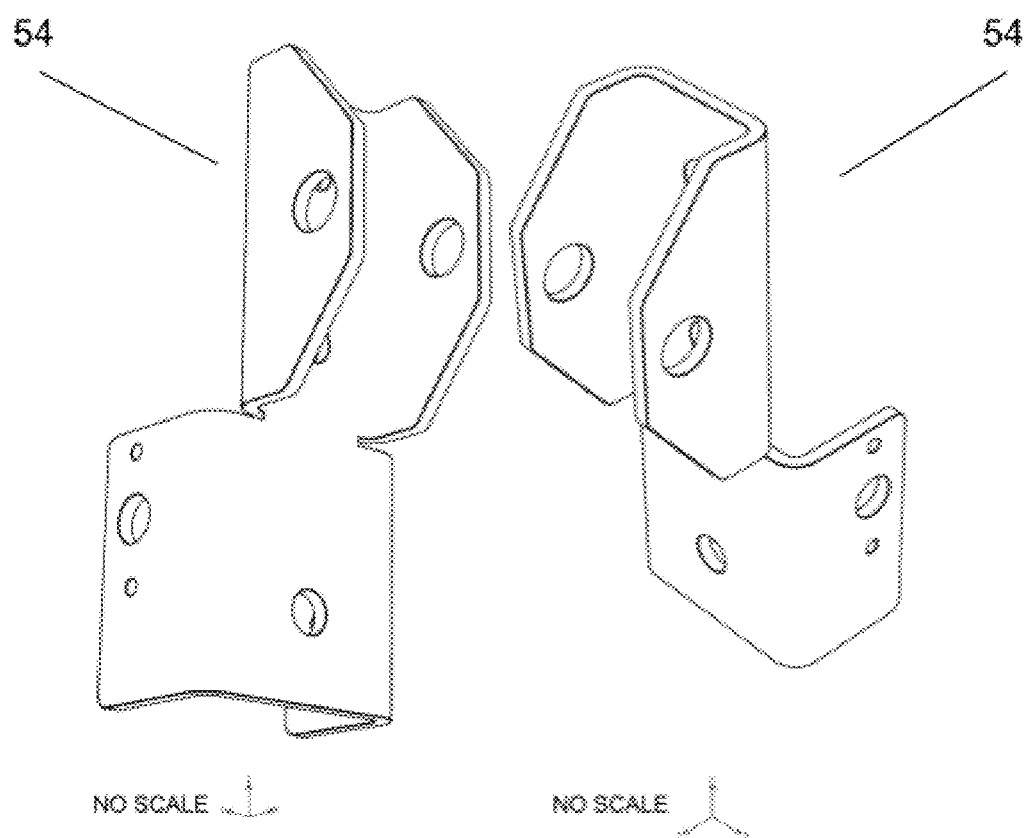
FIG. 5B is a perspective view of an exemplary strut slider of a modular mounting system.

FIG. 5B provides detailed perspective views of the strut slider 54. This strut slider 54 is supported by the roof trolley 32 and the roof strut 34 below it and supports the strut 52 on top of it through the fixed hinge 44. The moving pivot 30 is securely fastened to the struts mounted on the roof 26 and sidewall 24. The strut slider 54 acts as the prismatic joint of a 180-degree slider-crank mechanism, allowing for horizontal adjustments along the roof strut 34 and sidewall strut 56, facilitating precise positioning of the solar panels.

Figure 6A:
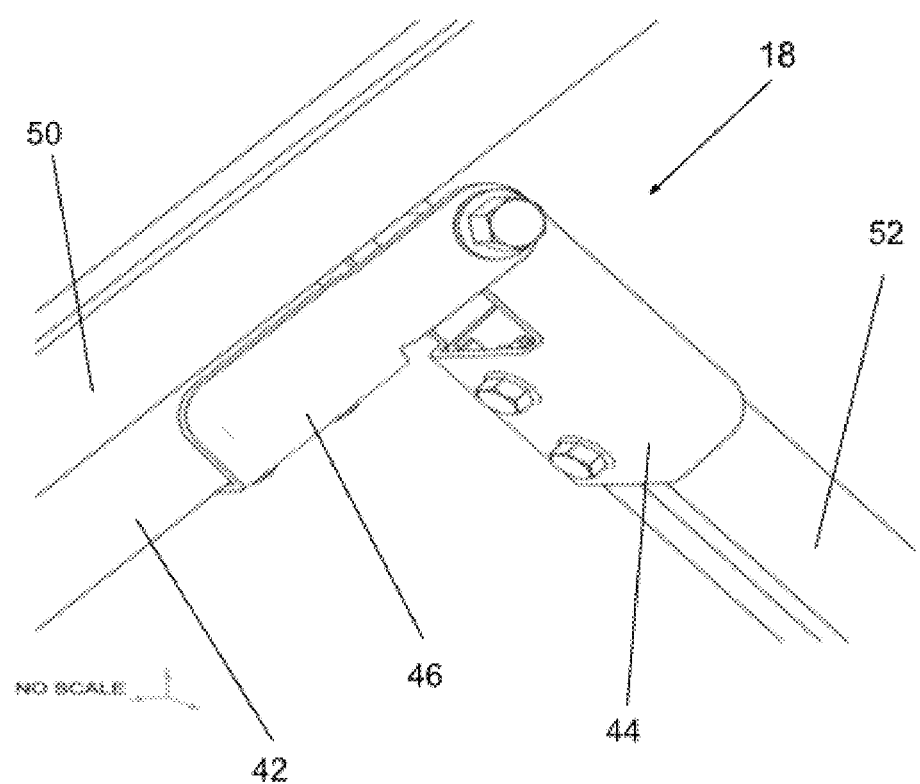
FIG. 6A is an enlarged perspective view of a moving pivot of an exemplary modular mounting system.

FIG. 6A provides an enlarged detailed perspective view of the moving pivot 18, positioned between the fixed pivot 16 and the moving pivot 30. This moving pivot 18 comprises a strut hinge 44, an offset hinge 46, and associated hardware. The strut hinge 44 is connected to the moving pivot 18 through the strut 52, allowing one degree of freedom, which enables free movement along the strut 52. It functions as a component of both the revolute and prismatic joints within a 180-degree crank-slider mechanism. The offset hinge 46 secures the strut 42, which supports another long strut 50 on top, designed to support the solar panels. These components are connected to the strut hinge 44 using bolts.

Figure 6B:
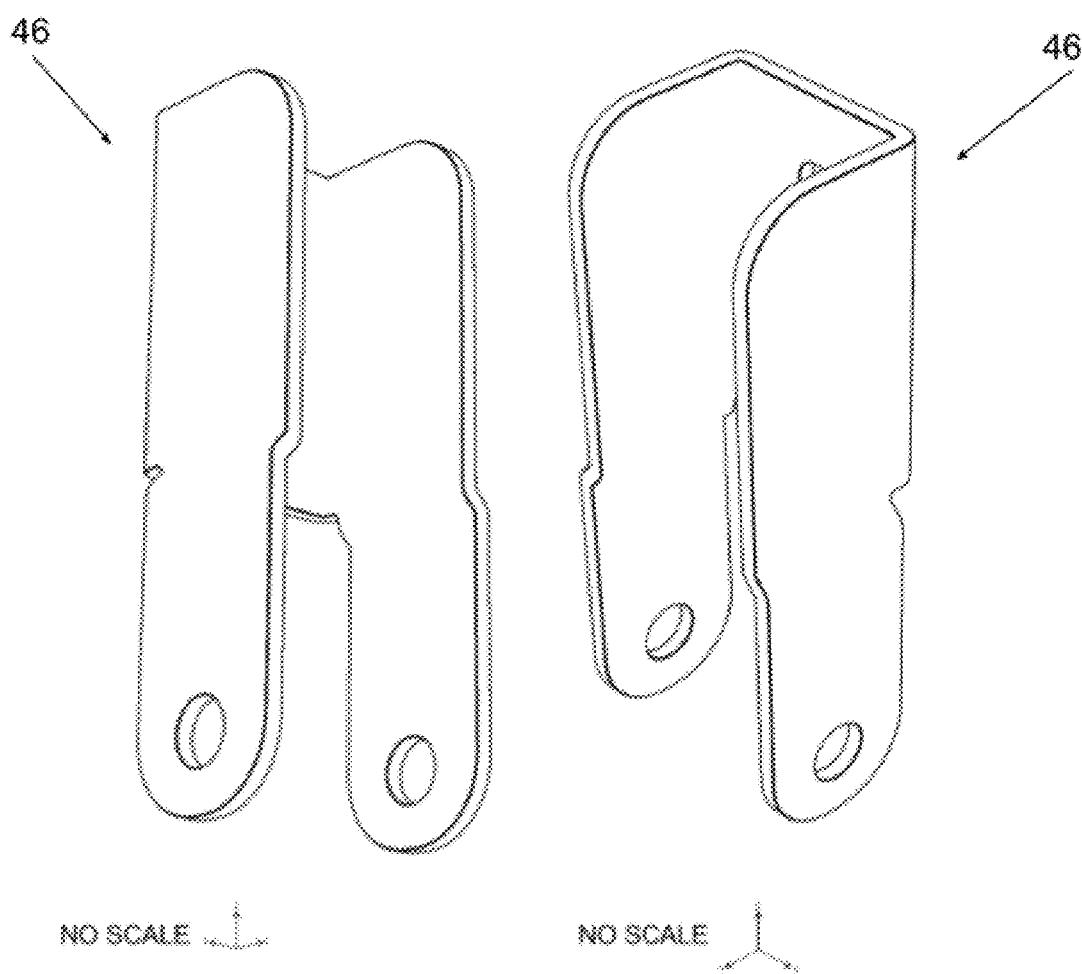
FIG. 6B is a perspective view of an exemplary offset strut hinge of a modular mounting system.

FIG. 6B provides a detailed perspective view of the offset strut hinge 46. The offset hinge 46 is designed to manage spatial constraints and alignment issues by providing an offset. There is a jog in the hinge body that allows it to overlap with the strut hinge 44. When combined with the strut hinge 44, it acts as a revolute joint in a 180-degree slider-crank mechanism.

Figure 7A:
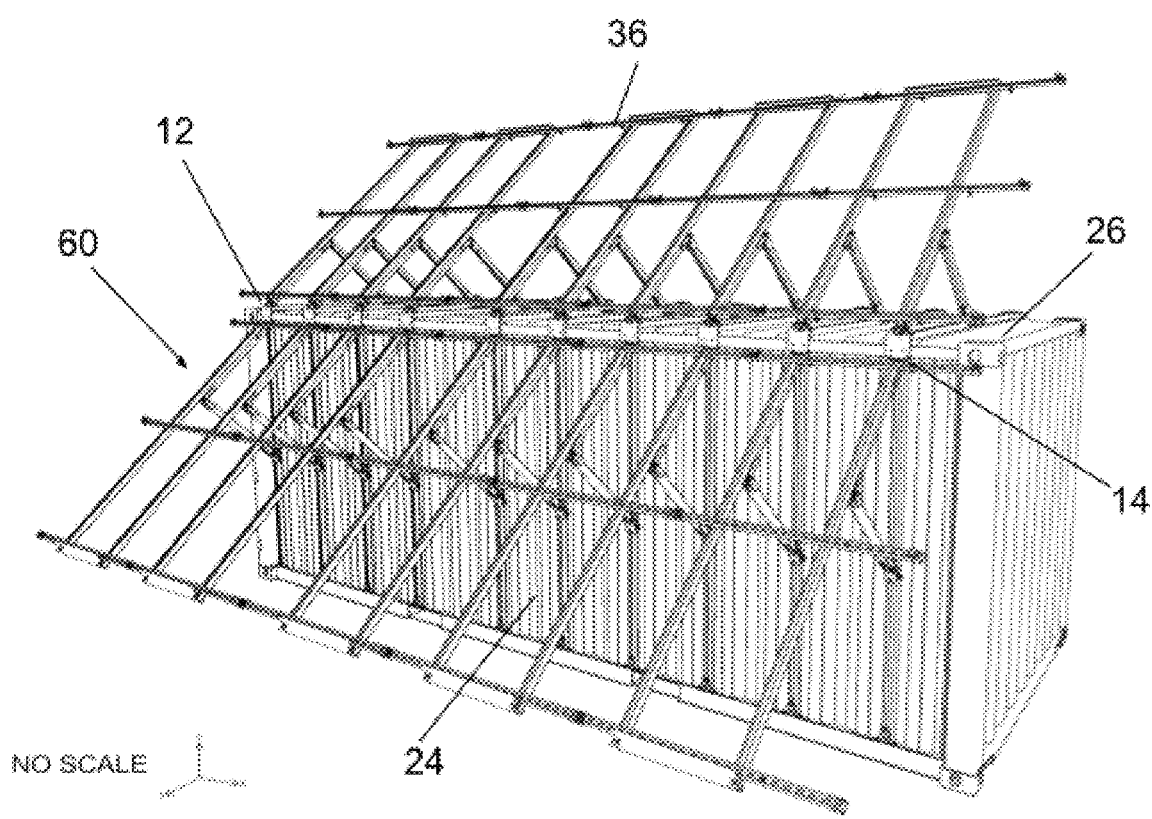
FIG. 7A is a perspective view showing multiple mounting systems installed on a 20' shipping container, without solar panels.
Figure 7B:
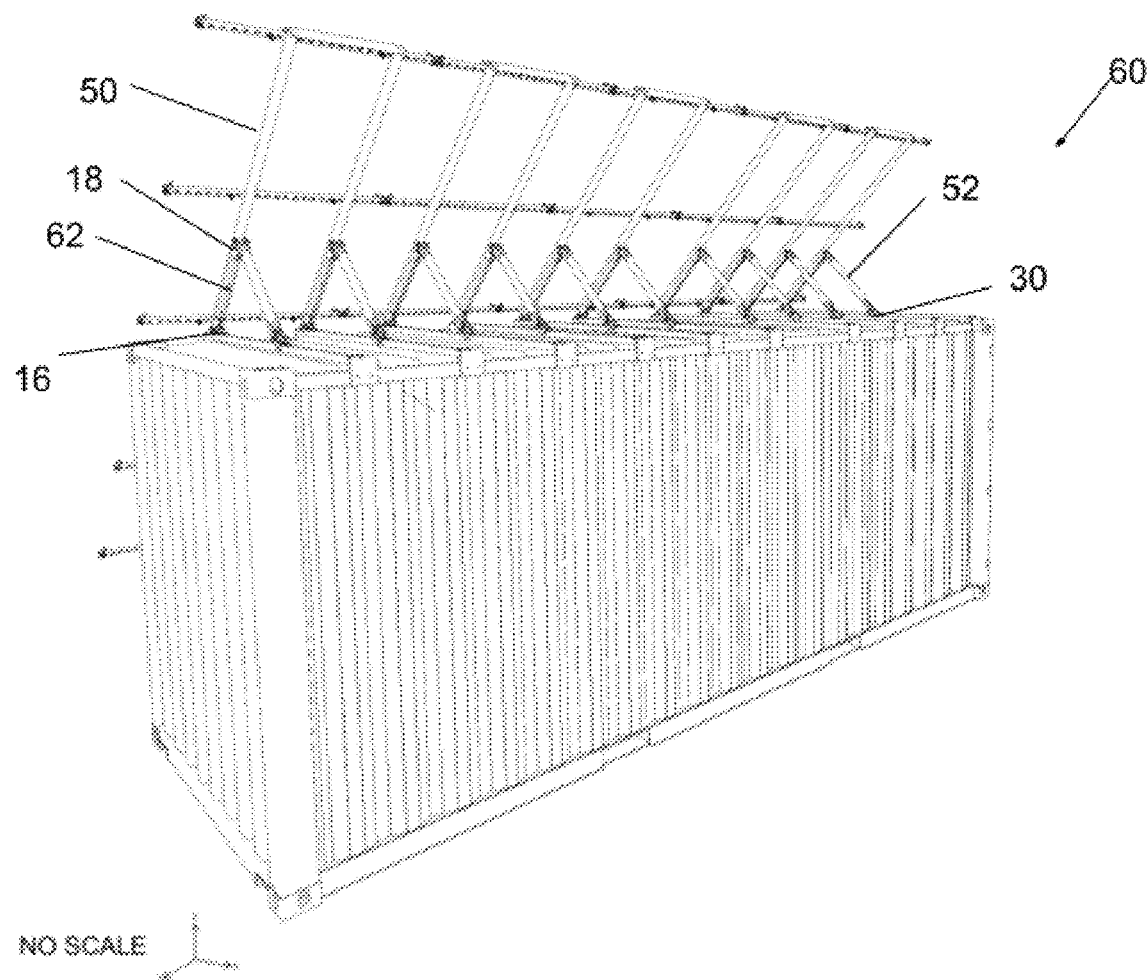
FIG. 7B is another perspective view of the embodiment of FIG. 7A.

FIGS. 7A and 7B provide perspective views of a 20' shipping container equipped with multiple side-by-side mounting systems 60, demonstrating the scalability and flexibility of the system up to 10 solar panels. This illustrates how the systems 60 may be installed in tandem to cover larger areas, preparing the container for a full array of solar panels on the sidewall 24 and roof 26. By connecting the low profile struts 36 as the mounting systems 60 are added, it forms an array of the solar panels. Each mounting system 60 is supported by the brackets 12, 14 individually. FIG. 7B illustrates another perspective view of the systems 60. This shows the rear of the mounting system 60 and how the long strut 50 is supported by struts 62 and 52 through the moving pivots 18, 30 and the fixed pivot 16.

Figure 7C:
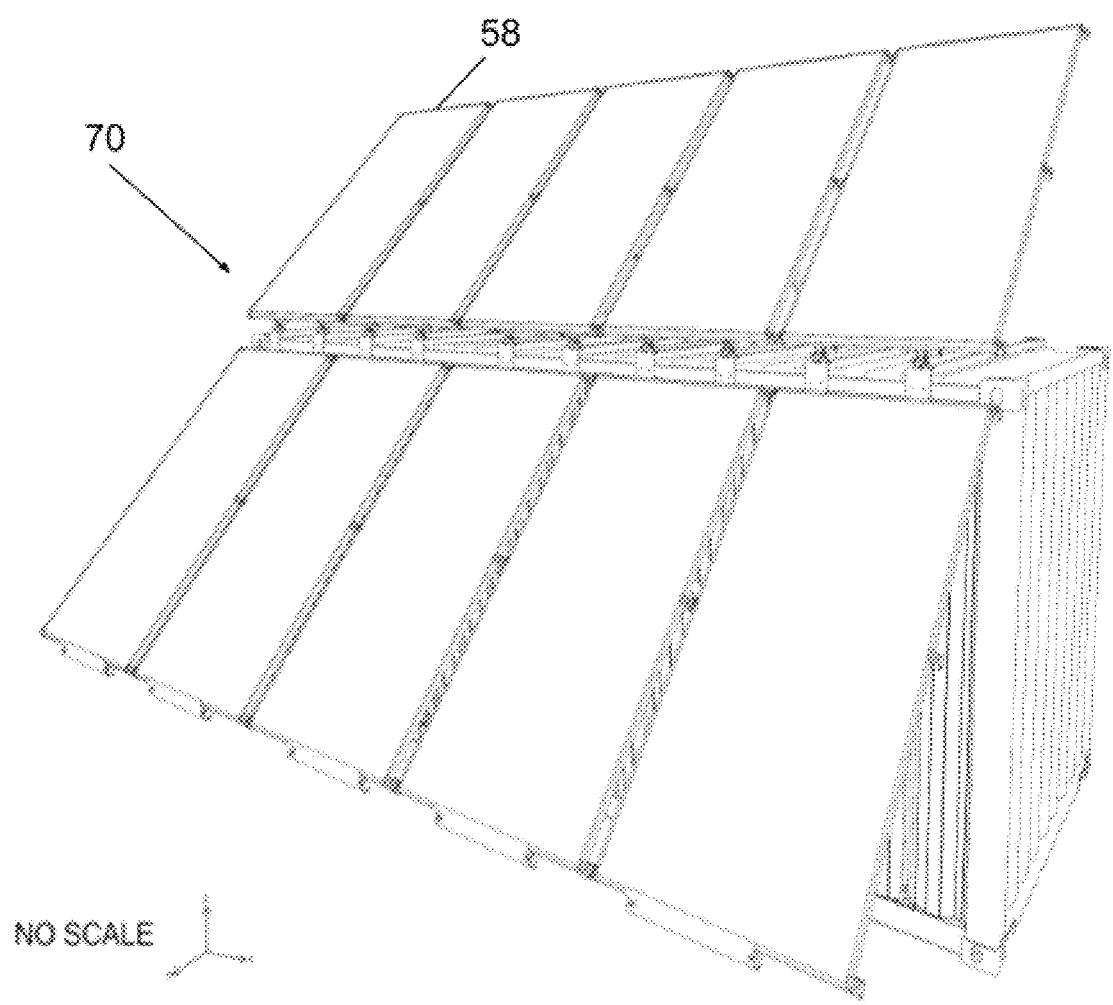
FIG. 7C is a perspective view of the embodiment of FIG. 7A installed with solar panels.

FIG. 7C provides perspective views of the embodiment of FIG. 7A equipped with solar panels 70, highlighting the system's operational state and scalability for up to 10 solar panels. The solar panels are installed on the mounting systems in tandem to cover larger areas with solar panels, maximizing the energy generation capacity of the container. The mounting angle of the solar panels are adjusted from flat position as shown in FIG. 2A to optimize sunlight exposure and adapt to the container's orientation. This view emphasizes the flexibility and scalability of the mounting system, accommodating different project requirements and container sizes.

Figure 8A:
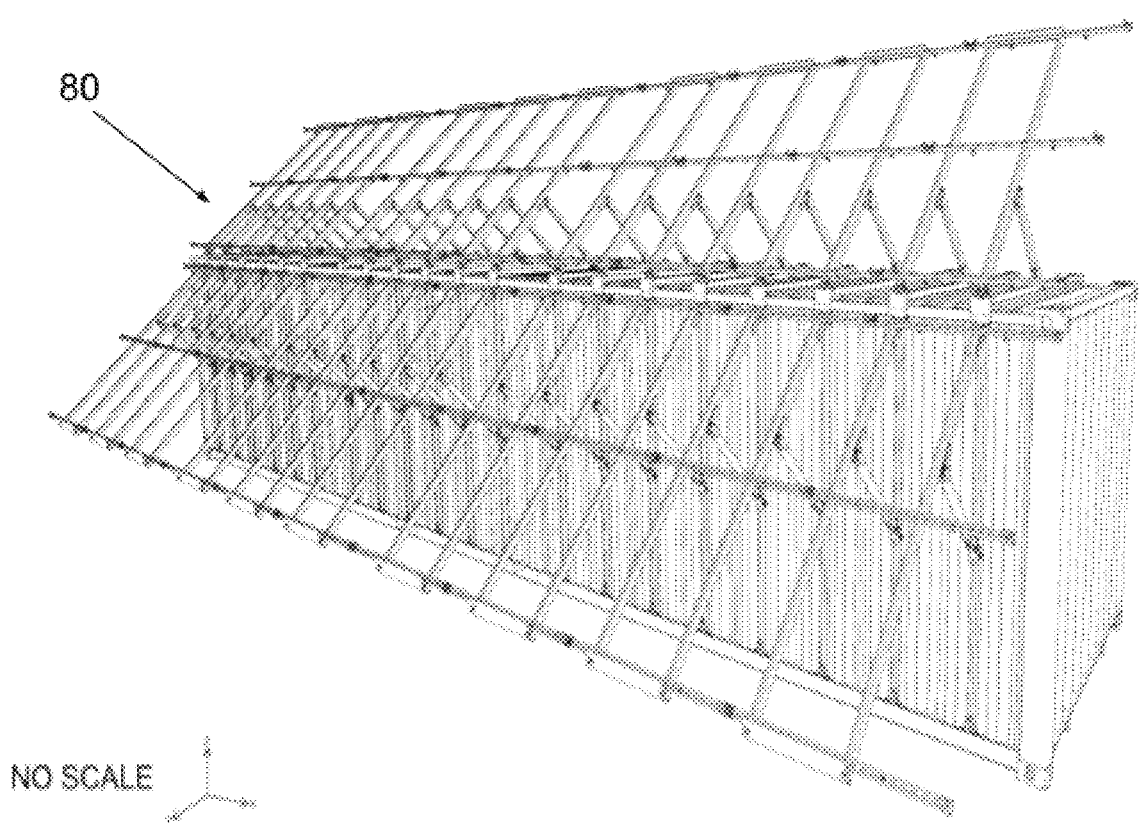
FIG. 8A is a perspective view showing multiple mounting systems installed on a 40' shipping container, without solar panels.

FIG. 8A provides a perspective view of a 40' shipping container equipped with multiple mounting kits 80, illustrating the scalability and flexibility of the system for installation of up to 20 solar panels. This mounting system has the ability to handle larger projects by accommodating more mounting kits, preparing the container for a full array of solar panels. This highlights the efficient use of space on the shipping container, ensuring that the mounting kits are positioned to allow for maximum solar panel coverage and optimal sunlight exposure. This illustrates the mounting kits are expandable to different container sizes and project requirements, allowing flexibility.

Figure 8B:
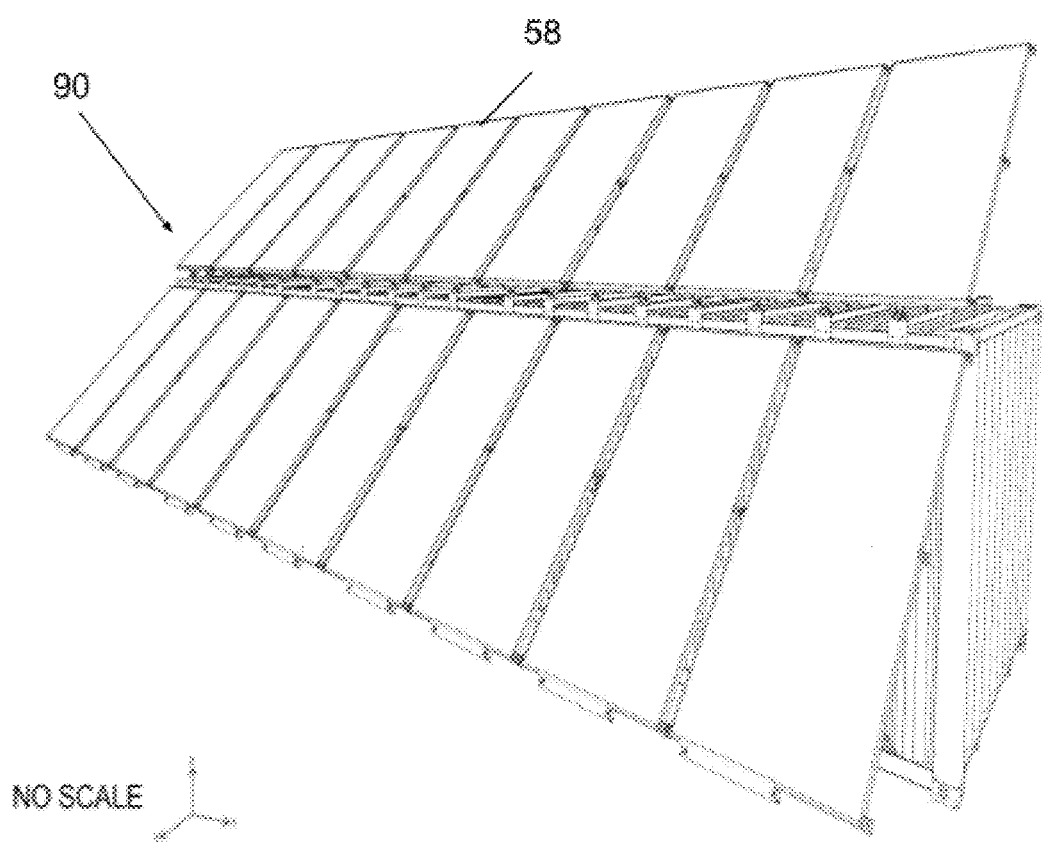
FIG. 8B is a perspective view of the embodiment of FIG. 8A installed with solar panels.

FIG. 8B provides a perspective view of multiple mounting systems 90 fully equipped with solar panels, showcasing the system's operational state and scalability for up to 20 solar panels. This figure demonstrates the system's ability to handle larger projects by accommodating a full array of solar panels, maximizing the energy generation capacity of the container. This highlights the efficient use of space on the shipping container, ensuring that the solar panels are positioned to allow for maximum coverage and optimal sunlight exposure. This emphasizes the system's adaptability to different container sizes and project requirements, showcasing the flexibility and expandability of the solar panel installations.

The foregoing is considered as illustrative only of the principles of the present invention. The scope of the claims should not be limited by the exemplary embodiments set forth in the foregoing, but should be given the broadest interpretation consistent with the specification as a whole.

What is claimed is:

1. A system for mounting a solar panel on an exterior surface of a shipping container, the system comprising:
    at least one fixed strut positionable along the exterior surface of the shipping container, the at least one fixed strut comprising opposed first and second ends;
    a first pivot member adjacent the first end of the at least one fixed strut, the first pivot member for pivotably retaining a first end of a first movable strut member for pivotable movement of the first movable strut member relative to the at least one fixed strut;
    a second movable strut member, a first end of the second movable strut member pivotably connected to a second end of the first movable strut member by a second pivot member; and
    a third pivot member configured to pivotably retain a second end of the second movable strut member, the third pivot member movable along the at least one fixed strut;
    the first movable strut member configured to support the solar panel, such that pivoting of the first movable strut member changes an angle of the solar panel relative to the exterior surface of the shipping container;
    such that as the third pivot member is moved toward the first end of the at least one fixed strut, the second pivot member is moved away from the at least one fixed strut and the angle of the solar panel relative to the exterior surface of the shipping container thereby increases; and
    such that as the third pivot member is moved toward the second end of the at least one fixed strut, the second pivot member is drawn toward the at least one fixed strut and the angle of the solar panel relative to the exterior surface of the shipping container thereby decreases.

2. The system of claim 1 further comprising first and second brackets configured to be secured in spaced-apart arrangement on the exterior surface of the shipping container, the first and second brackets configured to retain the at least one fixed strut therebetween along the exterior surface of the shipping container, the first bracket comprising the first pivot member.

3. The system of claim 2 wherein the first and second brackets are secured to hollow structural members at opposed edges of the shipping container, such that securing means pass into the hollow structural members without compromising an interior space of the shipping container.

4. The system of claim 1 wherein the at least one fixed strut comprises two fixed struts in side-by-side arrangement to support sides of the solar panel.

5. The system of claim 1 wherein the first movable strut member comprises a support member thereon, the support member sized and configured to support the solar panel.

6. The system of claim 5 wherein the support member comprises at least two parallel struts parallel to the at least one fixed strut, and at least two cross members perpendicular to the at least two parallel struts, the at least two cross members configured to receive and retain the solar panel.

7. The system of claim 5 wherein the support member comprises a handle distal from the first pivot member for use in pivoting the solar panel.

8. The system of claim 1 wherein the angle of the solar panel relative to the exterior surface of the shipping container is selectable between 0 degrees and 80 degrees.

9. The system of claim 1 wherein the at least one fixed strut comprises an outwardly-facing channel, the third pivot member comprising a strut trolley movable within the channel, the strut trolley supporting a hinge member configured to hingedly connect with the second end of the second movable strut member.

10. The system of claim 9 wherein the third pivot member further comprises a strut slider connected to the strut trolley and configured for movement along the channel, the strut slider comprising a pin for selectively locking the third pivot member at any of a plurality of selectable positions along the at least one fixed strut to thereby immobilize the solar panel at a given angle relative to the exterior surface of the shipping container.

11. The system of claim 1 wherein the at least one fixed strut comprises an outwardly-facing channel, the first and second movable strut members configured for at least partial nesting within the channel when the third pivot member is moved toward the second end of the at least one fixed strut.

12. The system of claim 1 wherein the exterior surface is either a roof or a sidewall of the shipping container.

13. The system of claim 1 wherein the exterior surface is both a roof and a sidewall of the shipping container, wherein the system comprises at least one fixed roof strut positionable along the roof of the shipping container and at least one fixed sidewall strut positionable along the sidewall of the shipping container.

14. A shipping container-mounted solar panel arrangement comprising:
    a shipping container comprising an exterior surface;
    at least one fixed strut secured along the exterior surface of the shipping container, the at least one fixed strut comprising opposed first and second ends;
    a first pivot member adjacent the first end of the at least one fixed strut, the first pivot member pivotably retaining a first end of a first movable strut member for pivotable movement of the first movable strut member relative to the at least one fixed strut;
    a second movable strut member, a first end of the second movable strut member pivotably connected to a second end of the first movable strut member by a second pivot member; and
    a third pivot member pivotably retaining a second end of the second movable strut member, the third pivot member movable along the at least one fixed strut;

the first movable strut member supporting a solar panel, such that pivoting of the first movable strut member changes an angle of the solar panel relative to the exterior surface of the shipping container;

such that as the third pivot member is moved toward the first end of the at least one fixed strut, the second pivot member is moved away from the at least one fixed strut and the angle of the solar panel relative to the exterior surface of the shipping container thereby increases; and such that as the third pivot member is moved toward the second end of the at least one fixed strut, the second pivot member is drawn toward the at least one fixed strut and the angle of the solar panel relative to the exterior surface of the shipping container thereby decreases.

15. The arrangement of claim 14 further comprising first and second brackets in spaced-apart arrangement on the exterior surface of the shipping container, the first and second brackets retaining the at least one fixed strut therebetween along the exterior surface of the shipping container, the first bracket comprising the first pivot member.

16. The arrangement of claim 14 wherein the at least one fixed strut comprises two fixed struts in side-by-side arrangement to support sides of the solar panel.

17. The arrangement of claim 14 wherein the exterior surface is either a roof or a sidewall of the shipping container.

18. The arrangement of claim 14 wherein the exterior surface is both a roof and a sidewall of the shipping container, wherein the arrangement comprises at least one fixed roof strut secured along the roof of the shipping container and at least one fixed sidewall strut secured along the sidewall of the shipping container.

* * * * *